United States Patent
Xu et al.

(10) Patent No.: US 12,403,413 B2
(45) Date of Patent: Sep. 2, 2025

(54) METHOD FOR GREEN AND LOW-COST EXTRACTION OF NICKEL-COBALT FROM LATERITE NICKEL ORE

(71) Applicants: PT QMB NEW ENERGY MATERIALS, Jakarta (ID); PT ESG NEW ENERGY MATERIAL, Jakarta (ID); GEM CO., LTD., Shenzhen (CN); PT GEM INDONESIA NEW ENERGY MATERIALS, Jakarta (ID)

(72) Inventors: Kaihua Xu, Shenzhen (CN); Satryo Soemantri Brodjonegoro, Jakarta (ID); Wenjing Wan, Jakarta (ID); Tegar Mukti Aji, Jakarta (ID); Rizky Wanaldi, Jakarta (ID); Piyan Rahmadi, Jakarta (ID); Andi Syaputra Hasibuan, Jakarta (ID); Emil Salim, Jakarta (ID)

(73) Assignees: PT QMB NEW ENERGY MATERIALS, Jakarta (ID); PT ESG NEW ENERGY MATERIAL, Jakarta (ID); GEM CO., LTD., Shenzhen (CN); PT GEM INDONESIA NEW ENERGY MATERIALS, Jakarta (ID)

(*) Notice: Subject to any disclaimer, the term of this patent is extended or adjusted under 35 U.S.C. 154(b) by 0 days.

(21) Appl. No.: 18/870,437

(22) PCT Filed: Jul. 31, 2023

(86) PCT No.: PCT/CN2023/110219
§ 371 (c)(1),
(2) Date: Nov. 28, 2024

(87) PCT Pub. No.: WO2025/025057
PCT Pub. Date: Feb. 6, 2025

(65) Prior Publication Data
US 2025/0170496 A1    May 29, 2025

(51) Int. Cl.
*B01D 15/18* (2006.01)
*B01D 15/20* (2006.01)
(Continued)

(52) U.S. Cl.
CPC ..... *B01D 15/1885* (2013.01); *B01D 15/1871* (2013.01); *B01D 15/203* (2013.01);
(Continued)

(58) Field of Classification Search
CPC ............ B01D 15/1885; B01D 15/1871; B01D 15/203; B01D 15/426; C22B 3/24;
(Continued)

(56) References Cited

U.S. PATENT DOCUMENTS

2009/0056502 A1* 3/2009 Mendes .............. C22B 23/0484
75/743

FOREIGN PATENT DOCUMENTS

CN          111004926 A       4/2020

OTHER PUBLICATIONS

Claims of PCT/CN2023/110219.
CNIPA (ISA), Written opinion for PCT/CN2023/110219, Dec. 21, 2023.

* cited by examiner

*Primary Examiner* — Danielle M. Carda
(74) *Attorney, Agent, or Firm* — Hemisphere Law, PLLC; Zhigang Ma

(57) ABSTRACT

A method for green and low-cost extraction of nickel-cobalt from laterite nickel ore includes: (1) iron removing pretreatment: adding an iron removing agent to a high-pressure leaching solution of the laterite nickel ore to reduce an iron concentration to less than 0.2 g/L to obtain a laterite nickel ore leaching solution; (2) nickel adsorption: adsorbing and enriching nickel in the laterite nickel ore leaching solution
(Continued)

using a first resin adsorption process to obtain a nickel adsorption resin and a nickel adsorption tail liquid; wherein the nickel adsorption resin is desorbed to obtain a crude nickel solution; (3) cobalt adsorption: subjecting the nickel adsorption tail liquid to cobalt adsorption and enrichment by a second resin adsorption process to obtain a cobalt solution by desorbing; (4) copper adsorption: subjecting the crude nickel solution to a third resin adsorption process for removing copper to obtain a purified nickel solution.

17 Claims, 1 Drawing Sheet

(51) Int. Cl.
  *B01D 15/42* (2006.01)
  *C22B 3/00* (2006.01)
  *C22B 3/24* (2006.01)
(52) U.S. Cl.
  CPC ............. *B01D 15/426* (2013.01); *C22B 3/24* (2013.01); *C22B 23/0453* (2013.01); *C22B 23/0415* (2013.01)
(58) Field of Classification Search
  CPC ... C22B 23/0453; C22B 23/0415; C22B 3/08; C22B 3/44; C22B 15/00; C22B 23/043; C22B 23/0461; C22B 3/42; Y02P 10/20
  USPC .......................................................... 75/743
  See application file for complete search history.

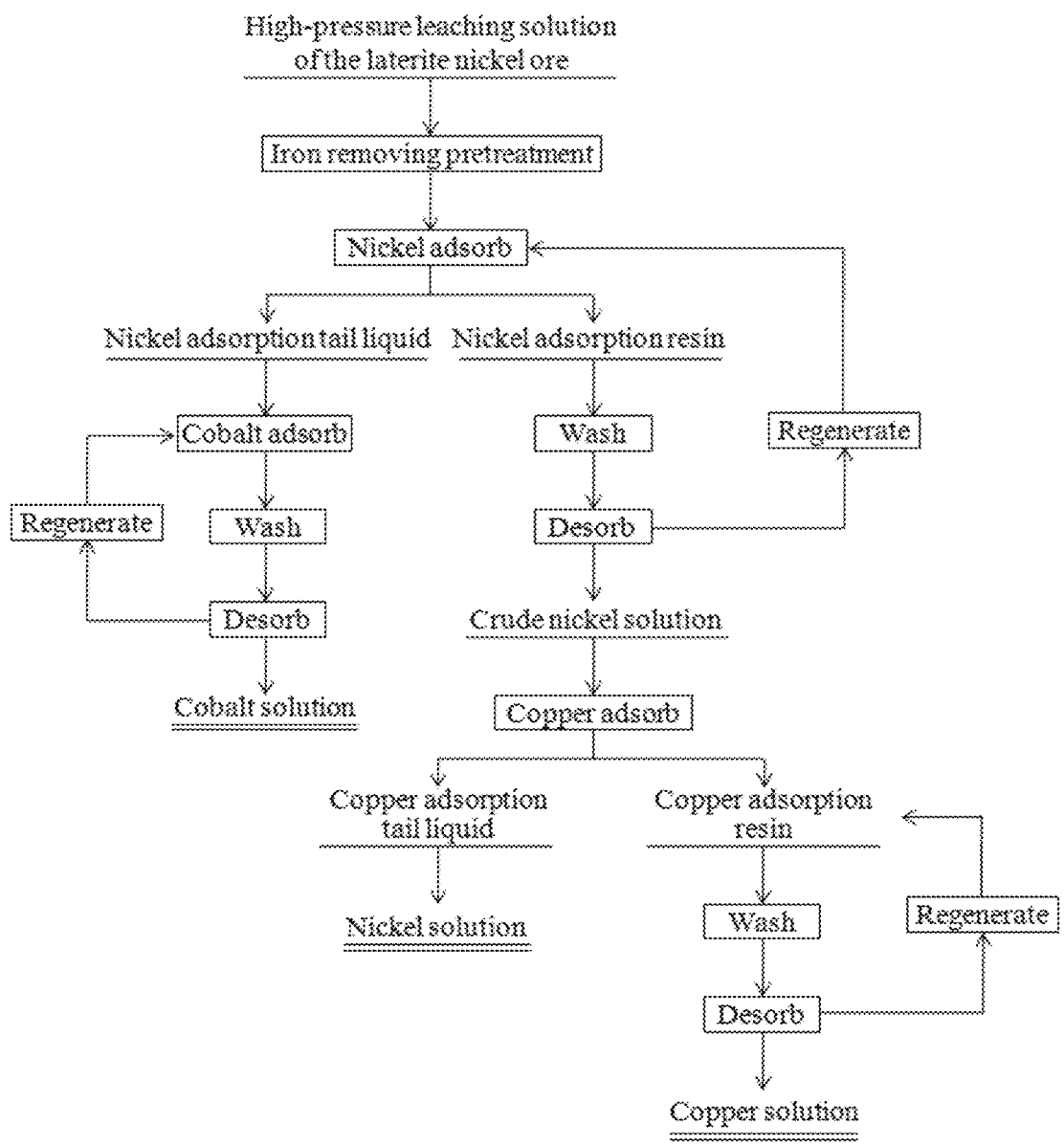

METHOD FOR GREEN AND LOW-COST EXTRACTION OF NICKEL-COBALT FROM LATERITE NICKEL ORE

FIELD OF THE DISCLOSURE

The disclosure relates to the technical field of hydrometallurgy, and in particular to a method for green and low-cost extraction of nickel-cobalt from laterite nickel ore.

BACKGROUND

In the low-carbon era where human beings attach importance to ecology, lithium-powered new energy vehicles and hydrogen-powered vehicles are increasingly becoming the main development direction of new energy vehicles. As a typical transition metal, nickel and cobalt have broad application prospects in positive electrode material of ternary lithium batteries and hydrogen fuel battery catalysts due to their unique and abundant d-band electronic structure. However, nickel and cobalt resources are scarce, and the future society will have a greater demand for nickel and cobalt resources.

At present, the grade of nickel in limonite laterite nickel ore is generally 1.1%-1.3%, which contains a lot of impurity elements such as Fe, Al, Ca, Cu, Mn, Sc, Cr, Zn, and Si. With the rapid development of the new energy automobile industry, how to prepare high-purity nickel-cobalt raw materials with low-cost and green is a problem to be solved urgently.

The extraction of nickel and cobalt from low-grade laterite nickel ore must rely on hydrometallurgy. For the extraction method, the extraction of high-purity nickel-cobalt raw material can be achieved due to the better selectivity of some extractants to nickel-cobalt in a specific system and the combination of other extractants and some procedures. Therefore, at home and abroad, the battery-grade nickel-cobalt raw material is obtained through a series of processes of high-pressure leaching—second-stage neutralization removing iron and aluminum—second-stage precipitation MHP—acid leaching—P204 extraction impurity—P507 extraction cobalt—P507 fishing magnesium—C272 deep impurity removing—preparation of high-purity nickel-cobalt sulfate. However, the process is tedious, the consumption of various auxiliary materials is large, a large amount of liquid alkali needs to be consumed when MHP is precipitated, the dispersion loss rate of nickel and cobalt is high and the comprehensive recovery cost is high. It cannot be ignored that the oil value in the raffinate and the product often exceeds the standard value due to the water solubility of the extractant during use, so the final nickel-cobalt product and the raffinate need to go through various oil removal processes, and this also results in the need to periodically purchase and supplement the extractant during production. Due to the influence of oil removal technology, the dissolved oil in the effluent raffinate is difficult to remove, which imposes a burden on both the wastewater treatment end and the environment.

SUMMARY

The object of the disclosure is to overcome the above-mentioned technical deficiencies, provide a method for green and low-cost extraction of nickel-cobalt from laterite nickel ore, and solve the technical problems in the prior art of using an extraction method to prepare battery-grade nickel and cobalt sulfates, such as complicated process flow, large consumption of reagents, high cost and environmental pollution.

In order to achieve the above technical object, the technical solution provided by the disclosure is:

In a first aspect, the disclosure provides a method for green and low-cost extraction of nickel-cobalt from laterite nickel ore including following steps: (1) iron removing pretreatment: adding an iron removing agent to the high-pressure leaching solution of the laterite nickel ore to reduce the iron concentration to less than 0.2 g/L to obtain a laterite nickel ore leaching solution; (2) nickel adsorption: adsorbing and enriching nickel in the laterite nickel ore leaching solution using a first resin adsorption process to obtain a nickel adsorption resin and a nickel adsorption tail liquid; wherein the nickel adsorption resin is desorbed to obtain a crude nickel solution; (3) cobalt adsorption: subjecting the nickel adsorption tail liquid to cobalt adsorption and enrichment by a second resin adsorption process and to desorb to obtain a cobalt solution by desorbing; copper adsorption: subjecting the crude nickel solution to a third resin adsorption process for removing copper to obtain a purified nickel solution.

Advantageous effects of the disclosure compared with the prior art include:

The process of the disclosure is green, environmentally friendly, and has a short process flow, which not only solves the environmental pressure caused by the current extraction method for preparing battery-grade nickel-cobalt sulfate but also greatly shortens the current process flow for preparing nickel-cobalt sulfate, saves the consumption of a large number of reagents and reduces the comprehensive recovery cost of nickel-cobalt. The process of the disclosure can obtain high-purity battery-grade nickel-cobalt sulfate through the combination of the iron removing pretreatment, nickel-cobalt adsorption process, and purification and copper removing tail sequence, wherein after nickel purification and enrichment in the copper removing step, the amount of water in the process of copper removing and purification of the nickel sulfate solution by the resin can be greatly reduced and the production efficiency can be improved.

BRIEF DESCRIPTION OF THE DRAWING

Figure is a process flowchart of the disclosure.

DETAILED DESCRIPTION OF PREFERRED EMBODIMENTS

In order that the objects, aspects, and advantages of the disclosure will become more apparent, a more particular description of the disclosure will be rendered by reference to the embodiments thereof which are illustrated in the appended drawings. It should be understood that the particular embodiments described herein are illustrative only and are not limiting.

Referring to figure, the disclosure provides a method for green and low-cost extraction of nickel-cobalt from laterite nickel ore including the following steps:

Step (1) iron removing pretreatment: After the high-pressure leaching of the laterite nickel ore, the iron concentration in the high-pressure leaching solution of the laterite nickel ore is reduced to less than 0.2 g/L by using an iron removing agent, and at the same time, the pH of the leaching solution is adjusted to 3-6 to obtain a laterite nickel ore leaching solution.

Preferably, the iron removing agent includes one or more of calcium oxide, calcium hydroxide, nickel carbonate, and cobalt carbonate.

Step (2) nickel adsorption: adsorbing and enriching nickel in the above laterite nickel ore leaching solution using a first resin adsorption process to obtain a nickel adsorption resin and a nickel adsorption tail liquid; the nickel adsorption tail liquid enters step (3) for cobalt adsorption; the nickel adsorption resin can be desorbed with 5-20% sulfuric acid to obtain a nickel sulfate solution, and other acid solutions can be selected according to actual situations to obtain a corresponding crude nickel solution.

Preferably, the nickel adsorption resin includes but is not limited to, LSC-495 resin.

Preferably, step (2) uses 2-5 stages of resin columns in series for nickel adsorption, and specifically includes:

① Nickel adsorption: the laterite nickel ore leaching solution is adsorbed through the column at a flow rate of 1-10 BV/h, and when the nickel concentration in the resin column tail liquid is >3 mg/L (the limit standard for metal ions in Indonesia when discharging wastewater), the introduction of the laterite nickel ore leaching solution is stopped.

② Resin washing: a part of the impurities adsorbed on the resin is washed with pure water at a flow rate of 1-4 BV/h to achieve the purpose of rapidly washing the impurities on the resin, and the washing time is 1-3 h.

③ Resin desorption: the nickel adsorption resin is desorbed with the acid solution A to obtain a crude nickel sulfate solution preliminarily enriched, and the desorption can be stopped when the nickel adsorption resin completely returns to the color before adsorption.

Preferably, the acid solution A used for the desorption of the nickel adsorption resin includes, but is not limited to, one or more of a sulfuric acid solution, a hydrochloric acid solution, a nitric acid solution, and an acetic acid solution with a mass concentration of 5-20%, etc.; the flow rate of the acid solution A is 1-5 BV/h.

④Resin regeneration: after the desorption, pure water is washed at a flow rate of 1-4 BV/h for 1-3 h.

Step (3) cobalt adsorption: the nickel adsorption tail liquid obtained in step (2) is passed through a column, cobalt adsorption enrichment is carried out through a second resin adsorption process, and then desorbed with 5-20% sulfuric acid to obtain a cobalt sulfate solution, or selecting other acid solutions according to practical situations.

Preferably, the cobalt adsorption resin includes but is not limited to, LSC-930 resin.

Preferably, step (3) uses 1-2 resin columns in series for cobalt adsorption, and specifically includes:

① Cobalt adsorption: the nickel adsorption tail liquid is passed through the column at a flow rate of 2-12 BV/h, and when the cobalt concentration in the cobalt adsorption tail liquid flowing out of the resin column is >3 mg/L (the limit standard for metal ions in Indonesia when discharging wastewater), the nickel adsorption tail liquid is stopped.

②Resin washing: a part of the impurities adsorbed on the resin is washed with the desorbed cobalt sulfate solution obtained in step (3) at a flow rate of 1-4 BV/h to achieve the purpose of rapidly washing the impurities on the resin, the washing time is 1-3 h.

③ Resin desorption: the cobalt adsorption resin is desorbed with acid solution B to obtain a preliminary enriched nickel solution, and desorption can be stopped until the resin returns to the color before adsorption.

Preferably, the acid solution B used in the desorption of the cobalt adsorption resin includes, but is not limited to, one or more of a sulfuric acid solution, a hydrochloric acid solution, a nitric acid solution, and an acetic acid solution with a mass concentration of 5-20%, etc.; the flow rate of the acid solution B is 1-3 BV/h.

④ Resin regeneration: after the desorption is completed, the desorbed cobalt adsorption resin is soaked with 5-36% hydrochloric acid for 2-12 h to completely desorb the residual metals on the resin, and then the resin is washed with pure water until the pH of the washing solution is between 6-7.

Step (4) Copper adsorption: copper impurities in the crude nickel solution obtained in step (2) are removed using a third resin adsorption process to obtain a copper adsorption tail liquid and a copper adsorption resin, wherein the copper adsorption tail liquid is a purified nickel solution; the copper adsorbing resin is then desorbed to obtain a copper solution.

It is to be understood that the above-mentioned "first", "second" and "third" are merely to distinguish the resin adsorption processes employed in the different steps and are not intended to limit the order or number thereof.

In addition, in order to save time in actual production, steps (3) and (4) can be carried out simultaneously, namely, the above-mentioned steps (3) and (4) are actually in a parallel relationship rather than in a sequential order.

Preferably, the copper adsorption resin includes but is not limited to, LSC-495, LSC-930, cation exchange resin KF320 or HP606.

The resin used in the disclosure has a high adsorption capacity and stability, does not require a transformation (conventionally, a transformation using sodium hydroxide is usually required), and has good regenerability; combined with the designed process of separating and extracting nickel and cobalt by resin, high purity battery grade nickel and cobalt can be obtained.

Preferably, a single resin column is used in step (4) for copper adsorption to complete copper removing, specifically including:

①Copper adsorption: the nickel sulfate solution is adsorbed through the column at a flow rate of 3-15 BV/h, and when the copper concentration in the tail liquid of the resin column is >0.3 mg/L (in order to ensure the purity of nickel sulfate), the introduction of the crude nickel sulfate solution product desorbed from step (2) is stopped.

② Desorption: desorption with acid solution C desorbs the resin to the color before adsorption. The resin was directly sent to the next round of copper adsorption after desorption.

Preferably, the acid solution C used in the desorption of the copper adsorption resin includes, but is not limited to, one or more of a sulfuric acid solution, a hydrochloric acid solution, a nitric acid solution, a phosphoric acid solution and an acetic acid solution with a mass concentration of 5-15%, etc.; and the flow rate of the acid solution C is 1-4 BV/h.

③Regeneration: after the desorption, pure water is washed at a flow rate of 1-4 BV/h for 1-3 h.

The main mechanism of action and advantages of the disclosure:

(1) Firstly, the nickel leaching solution of laterite nickel ore is directly subjected to iron removing pretreatment, and then nickel is extracted through a set of resin units in series, and at the same time, the adsorption tail liquid is passed into the resin unit for cobalt adsorption for cobalt extraction. Finally, the nickel sulfate solution obtained by desorption needs to pass through a resin column to remove copper, and the nickel sulfate solution is further purified; compared with the traditional extraction process, the process of the disclosure is green, environmentally friendly and has a short process flow, which not only solves the environmental pressure caused by the current extraction method for preparing battery-grade nickel-cobalt sulfate, but also greatly shortens the preparation process of nickel-cobalt sulfate, saves a large amount of reagent consumption and energy consumption, improves the recovery rate of nickel-cobalt and reduces the production cost of nickel-cobalt recovery.

(2) After adsorption is complete, the resin can be recycled for regeneration. The process of the disclosure can directly extract high-purity battery-grade nickel-cobalt sulfate from a laterite nickel ore leaching solution through the coordination of Iron removing, nickel-cobalt adsorption resin device and purification, and copper removing tail sequence, wherein after nickel purification and enrichment in the copper removing process, the amount of water in the purification and nickel solution by copper removing from the resin can be greatly reduced, and the production efficiency can be improved.

The disclosure will now be described in further detail by way of specific examples; in order to avoid redundant description, the components of the high-pressure leaching solution of laterite nickel ore used in the examples of the disclosure are described as shown in Table 1 below.

TABLE 1

Composition of high-pressure leaching solution of laterite nickel ore

| Element | Ni | Co | Mn | Mg | Ca | Fe | Al | Cr | Zn | Cu | Si |
|---|---|---|---|---|---|---|---|---|---|---|---|
| Content (g/L) | 3.9 | 0.41 | 3.5 | 6.1 | 0.98 | 3.6 | 4.2 | 0.2 | 0.15 | 0.029 | 0.25 |

In the following examples, LSC-495 resin was used as the nickel-cobalt adsorption resin; the cobalt adsorption resin is LSC-930 resin; KF320 was used as the copper removing resin.

Example 1

(1) iron removing treatment: CaO was added to the high-pressure leaching solution of the laterite nickel ore to complete the pre-iron removing treatment, and at the same time, the pH of the leaching solution was adjusted to 3, so as to obtain a laterite nickel ore leaching solution, the composition of which was shown in Table 2 below.

TABLE 2

Composition of laterite nickel ore leaching solution after iron removing pretreatment

| Element | Ni | Co | Mn | Mg | Ca | Fe | Al | Cr | Zn | Cu | Si |
|---|---|---|---|---|---|---|---|---|---|---|---|
| Content(g/L) | 3.74 | 0.39 | 3.2 | 5.7 | 0.52 | 0.2 | 1.89 | 0.08 | 0.06 | 0.015 | 0.011 |

(2) Nickel Adsorption

The nickel adsorption was carried out by using three-stage resin columns in series, and the laterite nickel ore leaching solution was passed through the column at a flow rate of 3 BV/h. When the Ni concentration in the nickel adsorption tail liquid was >3 mg/L, the nickel adsorption was stopped.

Pure water was used to wash the nickel adsorption resin at a flow rate of 3 BV/h, washed for 2 h, and 15% sulfuric acid was desorbed at a flow rate of 2 BV/h until the resin was completely recovered to the color before adsorption. The composition of the desorbed nickel sulfate solution was shown in Table 3 below. After desorption, the resin could be directed to the next round of nickel adsorption.

TABLE 3

Composition of nickel solution

| Element | Ni | Co | Cu | Fe | Mn | Mg | Ca | Al | Cr | Zn | Si |
|---|---|---|---|---|---|---|---|---|---|---|---|
| Content(g/L) | 21.7 | 0.001 | 0.078 | 0.003 | | | ≤0.0005 | | | | |

(3) Cobalt Adsorption

When a single-stage resin column was used, the nickel adsorption tail liquid discharged from the resin column was adsorbed at a flow rate of 5 BV/h during nickel adsorption, and when the Co concentration in the cobalt adsorption tail liquid was >3 mg/L, the nickel adsorption tail liquid was stopped.

Pure water was washed at a flow rate of 3 BV/h for 2 h and then desorbed with 15% sulfuric acid at a flow rate of 2 BV/h until the resin had substantially returned to its pre-adsorption color. The composition of the product cobalt sulfate solution desorbed was shown in Table 4 below. After the desorption, 30% industrial hydrochloric acid was used to soak the desorbed cobalt adsorption resin for 5 h, so that the resin completely returned to the color before desorption, so as to completely desorb the residual metals on the resin; finally, pure water was used to wash the resin at a flow rate of 4 BV/h until the pH of the washing solution was between 6-7.

TABLE 4

Composition of cobalt solution product

| Element | Co | Ni | Cu | Fe | Mn | Mg | Ca | Al | Cr | Zn | Si |
|---|---|---|---|---|---|---|---|---|---|---|---|
| Content(g/L) | 24 | | | | | | ≤0.0002 | | | | |

(4) Copper adsorption: copper impurities from the nickel sulfate solution obtained in step (2) was removed using a resin adsorption process to obtain a final battery-grade nickel sulfate solution product.

Specifically, a single resin column was used to remove copper; the nickel sulfate solution was passed through the column at a flow rate of 5 BV/h for adsorption. When the copper concentration of the copper adsorption tail liquid discharged from the resin column was >0.3 mg/L, the introduction of the nickel sulfate solution obtained in step (2) was stopped. The components of the copper adsorption tail liquid were shown in Table 5 below. Copper sulfate was desorbed with a sulfuric acid solution with a mass concentration of 10% at a flow rate of 2 BV/h, and the resin was desorbed to the color before adsorption. The resin was directly sent to the next round of copper adsorption after desorption.

TABLE 5

Composition of purified nickel solution product

| Element | Ni | Co | Cu | Fe | Mn | Mg | Ca | Al | Cr | Zn | Si |
|---|---|---|---|---|---|---|---|---|---|---|---|
| Content(g/L) | 20.2 | | | | | | ≤0.0001 | | | | |

As can be seen from a comparison between Table 3 and Table 5, according to the disclosure, the impurities in the nickel solution are substantially removed by copper removing through a single resin column, the loss of nickel is small, the purity of nickel in the obtained copper adsorption tail liquid is extremely high, and the requirements for battery-grade nickel sulfate are completely met.

Example 2

(1) iron removing treatment: CaO was added to the high-pressure leaching solution of laterite nickel ore to complete the pre-iron removing treatment, and at the same time, the pH of the leaching solution was adjusted to 4.8, so as to obtain a laterite nickel ore leaching solution, the composition of which was shown in Table 6 below.

TABLE 6

Composition of laterite nickel ore leaching solution after iron removing pretreatment

| Element | Ni | Co | Mn | Mg | Ca | Fe | Al | Cr | Zn | Cu | Si |
|---|---|---|---|---|---|---|---|---|---|---|---|
| Content(g/L) | 3.5 | 0.37 | 2.93 | 5.1 | 0.5 | 0.0001 | 0.015 | 0.0008 | 0.06 | 0.008 | 0.007 |

It can be seen from the comparison between Table 2 and Table 6 that the concentration of impurity metal ions such as Fe, Cr, and Al in the laterite nickel ore leaching solution is significantly reduced; it shows that the pH value of the obtained laterite nickel ore leaching solution increases with the increase of the amount of CaO, which facilitates the removal of impurity metal ions such as Mn, Mg, Fe, Al, Cr and Cu, and at the same time, in order to avoid excessive loss of nickel and cobalt, it is preferred to control the pH value of the laterite nickel ore leaching solution to be 3-6.

(2) Nickel Adsorption

The nickel adsorption was carried out by using four-stage resin columns in series, and the laterite nickel ore leaching solution was passed through the column at a flow rate of 4 BV/h. When the Ni concentration in the nickel adsorption tail liquid was >3 mg/L, the nickel adsorption was stopped.

Since the iron impurity adsorbed on the resin was very low with respect to Example 1, washing with pure water in step (2) at a flow rate of 3 BV/h for 1 h was sufficient, followed by desorption with 15% sulfuric acid at a flow rate of 2 BV/h until the resin was completely recovered to the color before adsorption, and the composition of the desorbed nickel sulfate solution was as shown in Table 7 below. After desorption, the resin could be directed to the next round of nickel adsorption.

TABLE 7

Composition of nickel solution

| Element | Ni | Co | Cu | Fe | Mn | Mg | Ca | Al | Cr | Zn | Si |
|---|---|---|---|---|---|---|---|---|---|---|---|
| Content(g/L) | 23.8 | 0.003 | 0.05 | | | | ≤0.0003 | | | | |

From a comparison between Table 3 and Table 7, it can be seen that the effective adsorption capacity of the resin for nickel increases because the content of impurities in the laterite nickel ore leaching solution after iron removing decreases.

(3) Cobalt Adsorption

When the one-stage resin column was used, the nickel adsorption tail liquid discharged from the resin column was adsorbed at a flow rate of 4 BV/h during nickel adsorption, and when the Co concentration in the cobalt adsorption tail liquid was >3 mg/L, the nickel adsorption tail liquid was stopped.

Pure water was washed at a flow rate of 3 BV/h for 1.5 h and then desorbed with 15% sulfuric acid at a flow rate of 2 BV/h until the resin had substantially returned to its pre-adsorption color. The composition of the product cobalt sulfate solution desorbed was shown in Table 8 below. Then, 30% industrial hydrochloric acid was used to soak the desorbed cobalt adsorption resin for 3 h, so that the resin completely returned to the color before desorption, so as to completely desorb the residual metals on the resin; finally, pure water was used to wash the resin at a flow rate of 4 BV/h until the pH of the washing solution was between 6-7.

TABLE 8

Composition of cobalt solution product

| Element | Co | Ni | Cu | Fe | Mn | Mg | Ca | Al | Cr | Zn | Si |
|---|---|---|---|---|---|---|---|---|---|---|---|
| Content(g/L) | 24.7 | | | | | ≤0.0002 | | | | | |

(4) Copper adsorption: copper impurities from the nickel sulfate solution obtained in step (2) was removed using a resin adsorption process to obtain a final battery-grade nickel sulfate solution product.

Specifically, a single resin column was used to remove copper; the nickel sulfate solution was passed through the column at a flow rate of 7 BV/h for adsorption. When the copper concentration of the copper adsorption tail liquid discharged from the resin column was >0.3 mg/L, the introduction of the nickel sulfate solution obtained in step (2) was stopped. The components of the copper adsorption tail liquid were shown in Table 9 below. Copper sulfate was desorbed with a sulfuric acid solution with a mass concentration of 10% at a flow rate of 2 BV/h, and the resin was desorbed to the color before adsorption. The resin was directly sent to the next round of copper adsorption after desorption.

TABLE 9

Composition of purified nickel solution product

| Element | Ni | Co | Cu | Fe | Mn | Mg | Ca | Al | Cr | Zn | Si |
|---|---|---|---|---|---|---|---|---|---|---|---|
| Content(g/L) | 22.1 | | | | | ≤0.0001 | | | | | |

The disclosure provides for washing the resin during the adsorption and enrichment stage of the nickel and cobalt by a portion of the nickel solution and cobalt solution, respectively, which greatly improves the purity of the nickel-cobalt solution product obtained from purification of the resin.

According to the disclosure, a high-purity battery-grade nickel sulfate and cobalt sulfate product can be obtained through simple step coordination, wherein the main content of nickel sulfate and cobalt sulfate can reach 99.9% or more, without the need for a conventional extractant, the process is simple, the kind of auxiliary materials required is small and the consumption is small.

The particular embodiments of the disclosure described above are not to be construed as limiting the scope of the disclosure. It is intended that the disclosure cover the modifications and variations of this invention provided they come within the scope of the appended claims and their equivalents.

What is claimed is:

1. A method for green and low-cost extraction of nickel-cobalt from laterite nickel ore, comprising the following steps:
   (1) iron removing pretreatment: adding an iron removing agent to a high-pressure leaching solution of the laterite nickel ore to reduce an iron concentration to less than 0.2 g/L to obtain a laterite nickel ore leaching solution;
   (2) nickel adsorption: adsorbing and enriching nickel in the laterite nickel ore leaching solution using a first resin adsorption process to obtain a nickel adsorption resin and a nickel adsorption tail liquid; wherein the nickel adsorption resin is desorbed to obtain a crude nickel solution;
   (3) cobalt adsorption: subjecting the nickel adsorption tail liquid to cobalt adsorption and enrichment by a second resin adsorption process and to obtain a cobalt solution by desorbing; and
   (4) copper adsorption: subjecting the crude nickel solution to a third resin adsorption process for removing copper to obtain a purified nickel solution.

2. The method for green and low-cost extraction of nickel-cobalt from laterite nickel ore according to claim 1, wherein in step (1), the iron removing agent comprises one or more of calcium oxide, calcium hydroxide, nickel carbonate, and cobalt carbonate.

3. The method for green and low-cost extraction of nickel-cobalt from laterite nickel ore according to claim 1, wherein in step (1), the iron removing agent plays a pH adjusting role and controls the pH value of the laterite nickel ore leaching solution to be 3-6.

4. The method for green and low-cost extraction of nickel-cobalt from laterite nickel ore according to claim 1, wherein in step (2), nickel adsorption is carried out using 2-5 stages of resin columns in series.

5. The method for green and low-cost extraction of nickel-cobalt from laterite nickel ore according to claim 1, wherein in step (2), the first resin adsorption process specifically comprises:
   nickel adsorption: the laterite nickel ore leaching solution being first passed through a column at a flow rate of 1-10 BV/h for adsorption;
   resin washing: the nickel adsorption resin being washed with pure water at a flow rate of 1-4 BV/h for 1-3 h; and
   resin desorption: the nickel adsorption resin being desorbed to obtain the crude nickel solution.

6. The method for green and low-cost extraction of nickel-cobalt from laterite nickel ore according to claim 5, wherein the first resin adsorption process further comprises resin regeneration: the desorbed nickel adsorption resin is directly subjected to the next round of nickel adsorption after being subjected to a pure water washing step again; in the resin washing, the flow rate of pure water is 1-4 BV/h and the washing time is 1-3 h.

7. The method for green and low-cost extraction of nickel-cobalt from laterite nickel ore according to claim 5, wherein the nickel adsorption resin is desorbed with acid solution A; the acid solution A comprises one or more of a sulfuric acid solution, a hydrochloric acid solution, a nitric acid solution and an acetic acid solution with a mass concentration of 5-20%; and the flow rate of the acid solution A is 1-5 BV/h.

8. The method for green and low-cost extraction of nickel-cobalt from laterite nickel ore according to claim 1, wherein during the nickel adsorption process, when a nickel concentration in the nickel adsorption tail liquid is >3 mg/L, the feeding of the laterite nickel ore leaching solution is stopped.

9. The method for green and low-cost extraction of nickel-cobalt from laterite nickel ore according to claim 1, wherein in step (3), cobalt adsorption is carried out using 1-2 stages of resin columns in series.

10. The method for green and low-cost extraction of nickel-cobalt from laterite nickel ore according to claim 1, wherein in step (3), the second resin adsorption process specifically comprises:
    cobalt adsorption: the nickel adsorption tail liquid being passed through the column at a flow rate of 2-12 BV/h for adsorption;
    resin washing: the cobalt adsorption resin being washed with a cobalt solution obtained from the previous desorption; and
    resin desorption: the cobalt adsorption resin being desorbed to obtain a cobalt solution.

11. The method for green and low-cost extraction of nickel-cobalt from laterite nickel ore according to claim 10, wherein the second resin adsorption process further comprises resin regeneration: the desorbed cobalt adsorption resin being soaked with 5-36% hydrochloric acid for 2-12 h to completely desorb the residual metals on the resin, then washing the resin with pure water until the pH of the washing solution is between 6-7, and then performing the next round of cobalt adsorption; in the resin washing, the flow rate of pure water being 1-4 BV/h and the washing time being 1-3 h.

12. The method for green and low-cost extraction of nickel-cobalt from laterite nickel ore according to claim 10, wherein the flow rate of the cobalt solution in the resin washing is 1-4 BV/h and the washing time is 1-3 h.

13. The method for green and low-cost extraction of nickel-cobalt from laterite nickel ore according to claim 10, wherein the nieke cobalt adsorption resin is desorbed with acid solution B; the acid solution B comprises one or more of a sulfuric acid solution, a hydrochloric acid solution, a nitric acid solution and an acetic acid solution with a mass concentration of 5-20%; and the flow rate of the acid solution B is 1-3 BV/h.

14. The method for green and low-cost extraction of nickel-cobalt from laterite nickel ore according to claim 1, wherein during the cobalt adsorption process, when a cobalt concentration in the cobalt adsorption tail liquid is >3 mg/L, the nickel adsorption tail liquid is stopped.

15. The method for green and low-cost extraction of nickel-cobalt from laterite nickel ore according to claim 1, wherein in the third resin adsorption process, a single resin column is used for copper adsorption.

16. The method for green and low-cost extraction of nickel-cobalt from laterite nickel ore according to claim 1, wherein in the third resin adsorption process, nickel sulfate solution is passed through a column at a flow rate of 3-15 BV/h for copper adsorption, and after a copper concentration in copper adsorption tail liquid exceeds the standard value, feeding of the crude nickel solution is stopped.

17. The method for green and low-cost extraction of nickel-cobalt from laterite nickel ore according to claim 16, wherein in the third resin adsorption process, after the copper adsorption is finished, the resin is desorbed using an acid solution C; the acid solution C comprises one or more of a sulfuric acid solution, a hydrochloric acid solution, a nitric acid solution, a phosphoric acid solution and an acetic acid solution with a mass concentration of 5-15%; and the flow rate of the acid solution C is 1-4 BV/h.

\* \* \* \* \*